US012809531B2

(12) United States Patent
Han

(10) Patent No.: US 12,809,531 B2
(45) Date of Patent: Nov. 24, 2026

(54) VECTOR PROCESSOR AND DATA PROCESSING METHOD FOR DISTRIBUTING AND STORING VECTOR DATA

(71) Applicant: REBELLIONS INC., Seongnam-si (KR)

(72) Inventor: Jeong Ho Han, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/321,021

(22) Filed: Sep. 5, 2025

(65) Prior Publication Data

US 2026/0003513 A1 Jan. 1, 2026

Related U.S. Application Data

(63) Continuation of application No. PCT/KR2023/003191, filed on Mar. 8, 2023.

(30) Foreign Application Priority Data

Mar. 6, 2023 (KR) ........................ 10-2023-0029286

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC ..... G06F 3/0619; G06F 3/0659; G06F 3/0673
See application file for complete search history.

(56) References Cited

U.S. PATENT DOCUMENTS

| | | | | |
|---|---|---|---|---|
| 9,552,205 | B2 | 1/2017 | Ermolaev et al. | |
| 9,965,416 | B2 | 5/2018 | Galda et al. | |
| 10,409,596 | B2 | 9/2019 | Cho et al. | |
| 10,915,494 | B1 * | 2/2021 | Shalev | G06F 9/3001 |
| 10,929,746 | B2 | 2/2021 | Litvak et al. | |
| 11,100,193 | B2 | 8/2021 | Gu et al. | |
| 11,101,801 | B2 | 8/2021 | Lee et al. | |

(Continued)

FOREIGN PATENT DOCUMENTS

| | | |
|---|---|---|
| EP | 3175355 B1 | 7/2018 |
| EP | 4116819 A1 | 1/2023 |

(Continued)

OTHER PUBLICATIONS

International Search Report for PCT/KR2023/003191 by Korean Intellectual Property Office dated Nov. 24, 2023.

(Continued)

*Primary Examiner* — Edward J Dudek, Jr.
(74) *Attorney, Agent, or Firm* — BROADVIEW IP LAW, PC

(57) ABSTRACT

A vector processor and an operation method of the vector processor are disclosed. Specifically, the vector processor may include a look-up table (LUT) memory in which data corresponding to an index value is stored, a processing unit configured to perform an operation based on the data, and a controller configured to identify a first index value based on an instruction and store first data in the LUT memory using the first index value.

19 Claims, 10 Drawing Sheets

(56) References Cited

U.S. PATENT DOCUMENTS

| | | | | |
|---|---|---|---|---|
| 11,630,668 | B1 * | 4/2023 | Traylor | G06F 9/30043 712/220 |
| 2011/0148886 | A1 | 6/2011 | Opala et al. | |
| 2013/0117302 | A1 | 5/2013 | Lee et al. | |
| 2013/0212353 | A1 * | 8/2013 | Mimar | G06F 9/30036 712/4 |
| 2014/0149657 | A1 * | 5/2014 | Jakovljevic | G06F 12/0207 711/109 |
| 2014/0207838 | A1 * | 7/2014 | Danne | G06F 9/3832 708/235 |
| 2017/0344369 | A1 * | 11/2017 | Cho | G06F 12/0607 |
| 2018/0181347 | A1 * | 6/2018 | Botman | G06F 3/0659 |
| 2018/0253310 | A1 * | 9/2018 | Stephens | G06F 11/073 |
| 2021/0255861 | A1 | 8/2021 | Ramesh et al. | |
| 2022/0051370 | A1 * | 2/2022 | Xie | G06T 5/75 |
| 2023/0004389 | A1 * | 1/2023 | Williams | G06F 9/30109 |

FOREIGN PATENT DOCUMENTS

| | | | |
|---|---|---|---|
| JP | 2021-061036 | A | 4/2021 |
| KR | 10-2013-0049117 | A | 5/2013 |
| KR | 10-2016-0040623 | A | 4/2016 |
| KR | 10-2016-0072620 | A | 6/2016 |
| KR | 10-2017-0067716 | A | 6/2017 |
| KR | 10-2019-0062129 | A | 6/2019 |
| KR | 10-2020-0070088 | A | 6/2020 |
| KR | 10-2022-0090379 | A | 6/2022 |

OTHER PUBLICATIONS

Office Action for KR 10-2023-0029286 by Korean Intellectual Property Office dated Jul. 17, 2025.

Notice of Allowance for KR 10-2023-0029286 by Ministry of Intellectual Property dated May 21, 2026.

* cited by examiner

VECTOR PROCESSOR AND DATA PROCESSING METHOD FOR DISTRIBUTING AND STORING VECTOR DATA

CROSS-REFERENCE TO RELATED APPLICATION

This application is a continuation of pending PCT International Application No. PCT/KR2023/003191, filed on Mar. 8, 2023, which claims priority to Korean Patent Application No. 10-2023-0029286, filed on Mar. 6, 2023, in the Korean Intellectual Property Office, the entire contents of which are hereby incorporated by reference in its entirety.

TECHNICAL FIELD

The present disclosure relates to a vector processor and an operation method thereof.

BACKGROUND ART

A lookup table (LUT) memory that stores data corresponding to an index value may store a coefficient for approximating a function. To increase the accuracy of function approximation, the LUT memory may occupy a large amount of space in a vector processor. A vector processor of an accelerator may support a variety of operations in addition to function approximation. However, the LUT memory, which takes up a large amount of space in the vector processor, may only store a coefficient for function approximation. Therefore, there is a need to develop an operation method of a vector processor to improve the computational performance of the vector processor by utilizing the LUT memory when the vector processor performs an operation other than function approximation.

DETAILED DESCRIPTION OF THE INVENTION

Technical Goals

According to example embodiments of the present disclosure, there is provided a vector processor and an operation method thereof. The technical goals to be achieved by the present example embodiments are not limited to the technical goals described above, and other technical goals can be inferred from the following example embodiments.

Technical Solutions

To achieve the aforementioned goals, a vector processor according to a first aspect of the present disclosure may include a look-up table (LUT) memory in which data corresponding to an index value is stored, a processing unit configured to perform an operation based on the data, and a controller configured to identify a first index value based on an instruction and store first data in the LUT memory using the first index value.

According to an example embodiment, the vector processor may further include a vector register, and the index value may be extracted from data stored in the vector register.

According to an example embodiment, the data stored in the LUT memory may include a coefficient for linear approximation of a predetermined function.

According to an example embodiment, the first index value may be a value designated by a field of the instruction.

According to an example embodiment, the processing unit may include a first processing unit for a multiply and accumulation (MAC) operation and a second processing unit that is an arithmetic and logic unit (ALU), and the second processing unit may perform a predetermined operation based on second data identified in the LUT memory based on a second index value.

According to an example embodiment, the first processing unit may perform a MAC operation based on fourth data identified in the LUT memory based on a third index value extracted from third data and the third data, and the fourth data may include a coefficient for linear approximation of a predetermined function.

According to an example embodiment, the controller may store the first data in the LUT memory based on the first index value, the first data being stored in at least one of a first memory in an accelerator including a vector register, a scalar register and the vector processor, and a second memory located external to the accelerator.

According to an example embodiment, the controller may store the first data stored in the LUT memory based on a fourth index value, in at least one of a first memory in an accelerator including a vector register, a scalar register and the vector processor, and a second memory located external to the accelerator.

According to an example embodiment, the first index value may be a value generated by a finite state machine (FSM) or counter logic operated based on the instruction.

According to an example embodiment, the vector processor may include a datapath between the second processing unit and the LUT memory.

According to an example embodiment, the vector processor may include a datapath between the LUT memory and at least one of the vector register, the scalar register, the first memory, and the second memory.

According to an example embodiment, the controller may include a direct memory access (DMA) unit configured to store, in the LUT memory, the first data stored in a first memory in an accelerator including the vector processor or a second memory located external to the accelerator or store the first data stored in the LUT memory in the first memory or the second memory.

According to an example embodiment, the vector may further include a vector register, and when the instruction is a loop-unrolled instruction, the controller may store at least a portion of data associated with data processing in the LUT memory and store a remaining portion other than the at least a portion among the data associated with data processing in the vector register.

According to an example embodiment, when the data processing is data processing related to convolution, the at least a portion may include at least one of feature data and a kernel weight related to the convolution.

According to an example embodiment, the vector processor may further include a vector register, and the controller may store the first data, stored in the vector register, in the LUT memory to perform register spill.

According to an example embodiment, the controller may store the first data, stored in the LUT memory, back in the vector register.

According to an example embodiment, the LUT memory may be a memory configured to simultaneously output a plurality of data stored at a plurality of locations in the LUT memory to correspond to a plurality of index values.

According to an example embodiment, the data may be stored in a first area of the LUT memory, and the first data may be stored in a second area of the LUT memory.

According to a second aspect of the present disclosure, an operation method of a vector processor including an LUT memory in which data corresponding to an index value is stored and a processing unit configured to perform an operation based on the data, may include identifying a first index value based on an instruction and storing first data in the LUT memory using the first index value.

A recording medium according to a third aspect of the present disclosure may be a non-transitory computer-readable recording medium including a program for performing the aforementioned operation method on a computer.

Effects of the Invention

According to the present disclosure, it is possible to store first data in a lookup table (LUT) memory using a first index value, which may reduce register pressure. In addition, by storing the first data in the LUT memory located in a vector processor, a computational performance of the vector processor may increase. For example, the LUT memory may store not only data associated with a coefficient related to function approximation, but also data associated with an operation other than function approximation. Thus, a storage space of the LUT memory may be used efficiently, register pressure may be reduced, and the computational performance of the vector processor may be improved.

Effects of the present disclosure are not limited to those described above and other effects may be made apparent to those skilled in the art from the following description.

MODE FOR CARRYING OUT THE INVENTION

Figure 1:
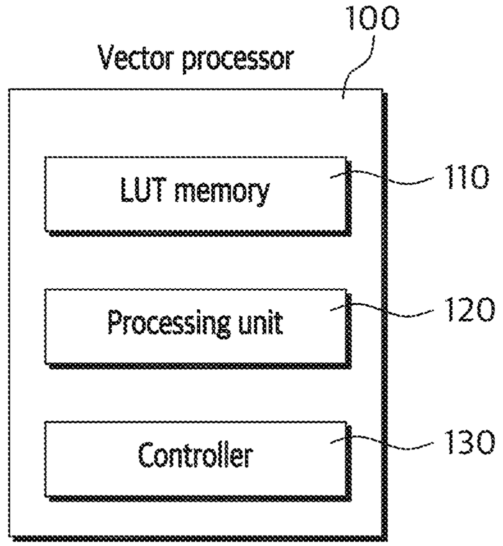
FIG. 1 illustrates a vector processor according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may indicate the following meaning including: A alone; B alone; C alone; both A and B together; both A and C together; both B and C together; or all three of A, B, and C together.

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the accompanying drawings.

In describing the example embodiments, descriptions of technical contents that are well known in the art to which the present disclosure belongs and are not directly related to the present specification will be omitted. This is to more clearly communicate without obscuring the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general-purpose computer, special purpose computer, or other programmable data processing equipment, those instructions executed through the computer or the processor of other programmable data processing equipment may create a means to perform the functions described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

Example embodiments of the present disclosure are described below in detail with reference to the drawings.

FIG. 1 illustrates a vector processor according to an example embodiment.

A vector processor 100 may include a look-up table (LUT) memory 110, a processing unit 120, and a controller 130. According to an example embodiment, the vector processor 100 may be a vector processor for processing a vector operation. Specifically, the vector processor 100 may be a vector processor that processes a large amount of data in a form of vector and may be a vector processor located in an accelerator.

The vector processor 100 may quickly process various operations including function approximation. For example, the vector processor 100 may process an operation such as convolution, depthwise convolution, activation, pooling, normalization, data reformatting, and the like. FIG. 1 illustrates the vector processor 100 including elements related to the present example embodiment. However, it is apparent to those skilled in the art that other general-purpose elements can be included in addition to the elements illustrated in FIG. 1.

The LUT memory 110 may be a memory in which data corresponding to an index value is stored. For example, the LUT memory 110 may be an LUT memory that outputs data corresponding to an index value in response to an index value being input. Specifically, the LUT memory 110 may simultaneously output a plurality of data stored at a plurality of locations within the LUT memory 110 corresponding to a plurality of index values. The LUT memory 110 may be a memory that outputs a plurality of data corresponding to an address containing a plurality of index values. The LUT memory 110 that outputs the plurality of data corresponding to the address including the plurality of index values may have a structure in which a plurality of memories is connected in parallel. Each of the plurality of memories may be one of a single-port memory and a dual-port memory. The single-port memory may be a memory that universally uses one port as a reading port and a writing port, and the dual-port memory may be a memory that includes a reading port and a writing port individually.

When an index value is input, the LUT memory 110 may output the data corresponding to the index value. When the vector processor 100 includes a vector register, the index value may be extracted from the data stored in the vector registers. For example, the index value may be T bits included in the vector data stored in the vector register. The T bits may be upper T bits of the vector data.

The data stored in the LUT memory 110 may include a coefficient for function approximation. Specifically, when the vector processor 100 performs an activation operation, the LUT memory 110 may store coefficients for approximating a function related to the activation operation. Here, the function approximation may be a piecewise linear approximation for linearly approximating a function for each of a plurality of intervals. In addition, the function approximation may also be a piecewise polynomial approximation for approximating a function in a polynomial form for each of the plurality of intervals. In this instance, the LUT memory 110 may store a coefficient related to function approximation for each of the plurality of intervals.

For example, when the function approximation is the piecewise linear approximation, coefficients corresponding to a first interval among coefficients stored in the LUT memory 110 may include a first coefficient and a second coefficient. The first coefficient may be a coefficient that is a target of a multiplication operation with vector data, and the second coefficient may be a coefficient that is added to a result value obtained according to the multiplication operation between the vector data and the first coefficient.

To minimize an error in function approximation, the LUT memory 110 may be configured as a memory with a lot of depth. In addition, to allow the vector processor 100 to efficiently process a plurality of data, the LUT memory 110 may be configured in a form that includes a plurality of ports and has a structure in which a plurality of memories is connected in parallel. Accordingly, the LUT memory 110 located in the vector processor 100 may take up a large amount of space in the vector processor 100. According to an example embodiment, the LUT memory 110 located in the vector processor 100 may occupy about 20 to 30% of the space of the vector processor 100.

Also, as a size of the vector register in the vector processor 100 increases, performance may improve, but a physical size of the vector processor 100 may also increase, so the size of the vector register has a physical limit. Accordingly, the LUT memory 110 may be used for purposes other than storing coefficients related to function approximation to obtain a great technical utility.

As to this, example embodiments disclosed herein may relate to an operation method of the vector processor 100 using the LUT memory 110. The LUT memory 110 may store first data corresponding to a first index value, and the first data stored in the LUT memory 110 may be data associated with an operation other than function approximation. The operation other than function approximation may include, for example, convolution, depthwise convolution, activation, pooling, normalization, and data reformatting.

For example, when performing the data reformatting, the controller 130 may store a plurality of vector data that is a target of the data reformatting, in the LUT memory 110. The controller 130 may control the processing unit 120 to perform an operation for transforming an arrangement of the plurality of vector data stored in the LUT memory 110 into a row-centered arrangement or a column-centered arrangement. In addition, when performing the convolution, the controller 130 may store at least a portion of a plurality of convolution-related vector data in the LUT memory 110. The controller 130 may control the processing unit 120 to perform a convolution operation based on the plurality of convolution-related vector data including vector data stored in the LUT memory 110. The LUT memory 110 may store not only data associated with a coefficient related to function approximation, but also data associated with the operation other than function approximation. Thus, a storage space of the LUT memory 110 may be used efficiently, register pressure may be reduced, and the computational performance of the vector processor 100 may be improved.

The processing unit 120 may perform an operation based on data. For example, the processing unit 120 may include a first processing unit for a multiply and accumulation (MAC) operation and a second processing unit that is an arithmetic and logic unit (ALU). The processing unit 120 may perform an operation based on at least one of data stored in a second memory located external to an accelerator, a first memory in the accelerator, a scalar register, and the vector register in the vector processor 100 in addition to the data stored in the LUT memory 110.

The controller 130 may control an overall operation of the vector processor 100. The controller 130 may identify the first index value based on an instruction and store the first data in the LUT memory 110 using the first index value. The first data may be data associated with an operation other than function approximation. The controller 130 may identify the first index value based on a field of an instruction received from a program memory in the accelerator. The controller 130 may store the first data corresponding to the first index value in the LUT memory 110.

The instruction may include an instruction that allows the vector processor 100 to process a predetermined operation. The instruction may include an instruction to store data stored in the LUT memory 110 in another memory or register. In addition, the instruction may include an instruction to store data at a predetermined location in the LUT memory 110 corresponding to an index value.

The register pressure of the vector processor 100 may be reduced when the controller 130 stores the first data, which is data associated with an operation other than function approximation, in the LUT memory 110. In the present disclosure, a high register pressure may indicate that a large amount of data has to be stored in a register to process the instruction. In relation to this, a high register pressure may indicate that a large number of registers are required to process the instruction. Specifically, a high register pressure may indicate that an amount of data that has to be stored in the vector register to process the instruction is greater than an amount of data that can be stored in the register. In this instance, a number of registers required to process the instruction may be greater than a number of registers in the vector processor.

Figure 2:
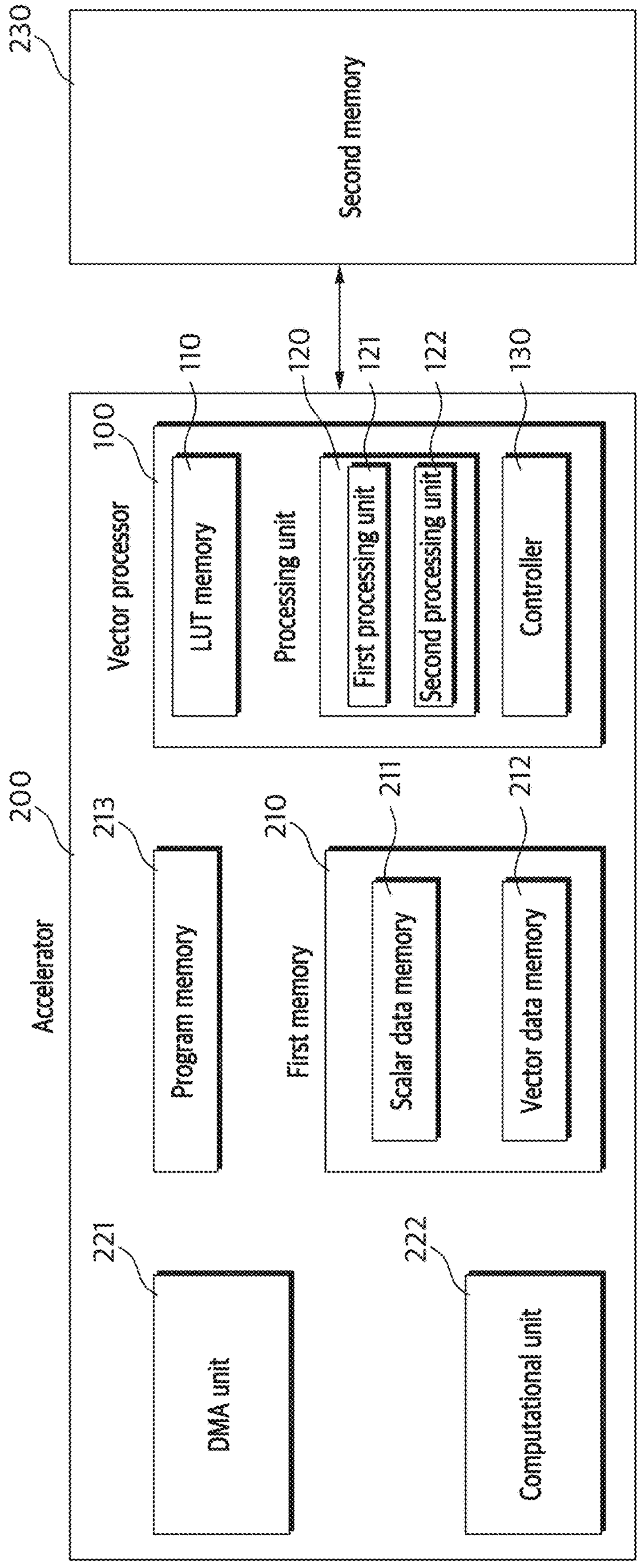
FIG. 2 illustrates an accelerator including a vector processor and a second memory according to an example embodiment.

FIG. 2 illustrates an accelerator including a vector processor and a second memory according to an example embodiment.

In FIG. 2, an accelerator 200 may include the vector processor 100, a first memory 210, a program memory 213, a direct memory access (DMA) unit 221, and a computational unit 222. According to an example embodiment, the accelerator 200 may be dedicated hardware for a neural network to quickly process an operation frequently used in the neural network. According to an example embodiment, the accelerator 200 may be a hardware accelerator such as a neural processing unit (NPU), a tensor processing unit (TPU), a neural engine, and the like, which are dedicated modules for running neural networks, but is not limited thereto. FIG. 2 illustrates the accelerator 200 including elements related to the present example embodiment. However, it is apparent to those skilled in the art that other general components may also be included in addition to the elements illustrated in FIG. 2. As to the vector processor 100, description of content redundant to that of FIG. 1 will be omitted.

According to an example embodiment, data stored in the LUT memory 110 may vary based on a point in time at which an instruction is processed. At a first point in time, the data stored in the LUT memory 110 may be data including a coefficient for linear approximation of a function. At a second point in time, the data stored in the LUT memory 110 may be first data associated with an operation other than linear approximation of a function. For example, when an operation related to linear approximation of a function is not performed at a predetermined point in time, the first data associated with an operation other than linear approximation of a function may be stored in the LUT memory 110.

According to another example embodiment, the LUT memory 110 may be divided into a first area and a second area. The data including the coefficient for linear approximation of the function may be stored in the first area of the LUT memory 110. The first data associated with the operation other than linear approximation of the function may be stored in the second area of the LUT memory 110. For example, when the second area of the LUT memory 110 has a free space, an operation of identifying a first index value based on an instruction and storing the first data in the LUT memory 110 using the first index value may be performed.

The processing unit 120 may include a first processing unit 121 for a MAC operation and a second processing unit 122 that is an ALU. Specifically, the second processing unit 122 may be a processing unit that performs operations other than addition and multiplication operations performed in the first processing unit 121. For example, the second processing unit 122 may perform logical operations including a shift operation and an and operation.

When performing an operation related to function approximation in the vector processor 100, the first processing unit 121 may perform the MAC operation based on fourth data identified in the LUT memory 110 based on a third index value extracted from third data and the third data. The MAC operation of the first processing unit 121 may be expressed by Equation 1 below.

$$Y = A * X + B \qquad \text{[Equation 1]}$$

Here, X denotes the third data. In addition, when the third index value extracted from the third data is input, the LUT memory 110 may output the fourth data corresponding to the third index value. For example, the third index value may be upper T bits of the third data, and the fourth data may be {A, B}. Specifically, A being a first coefficient in the fourth data may be a coefficient that is the target of a multiplication operation with vector data X. In addition, B being a second coefficient in the fourth data may be a coefficient added to A*X, which is a result of the multiplication operation of the vector data X and A which is the first coefficient.

The second processing unit 122 may perform a predetermined operation based on second data identified in the LUT memory 110 based on a second index value. In relation to this, the vector processor 100 may include a datapath between the second processing unit 122 and the LUT memory 110. For example, the data stored in the LUT memory 110 may be used as an input value for the second processing unit 122. Here, the second data may be data associated with function approximation or the first data associated with an operation other than function approximation.

The controller 130 may identify a first index value based on an instruction. The instruction may be an instruction related to data processing. Here, the first index value may be a value designated by a field of the instruction. Specifically, when the instruction is related to reading data stored in the LUT memory 110, the first index value may be designated by a field of the instruction.

Although not shown in FIG. 2, the vector processor 100 may include a unit related to a counter logic or finite state machine (FSM). In this instance, an index value may be a value generated by the counter logic or FSM operated by the instruction.

1) The counter logic is an electronic logic circuit including an adder or subtractor (adder/subtractor) and one or more flip-flops, and may perform a predetermined operation a predetermined number of times while increasing or decreasing a value set in the counter logic. 2) An FSM may be a finite state machine that defines a finite number of operating states, and for each operating state, defines a value to be output externally based on an input value, and a value to be changed as a next operating state. In relation to this, the FSM may include a flip-flop for storing an operating state and an electronic logic circuit for determining the output value and the next operating state value. The vector processor 100 may identify the first index value generated by the unit related to the counter logic or FSM and identify a plurality of data corresponding to the first index value among the data stored in the LUT memory 110.

For example, the controller 130 of the vector processor 100 may control the LUT memory 110 to output a plurality of data at once or store the plurality of data at once in the LUT memory 110 based on the first index value, which is a value generated by the unit related to the counter logic or FSM.

A memory in the accelerator 200, which includes the vector processor 100, may include the first memory 210 and the program memory 213. In addition, the first memory 210 may include a scalar data memory 211 and a vector data memory 212.

The scalar data memory 211 may store scalar data. For example, the scalar data memory 211 may store a value of an argument related to an operation. The vector data memory 212 may store vector data associated with an operation in the accelerator 200. For example, when processing an image on the accelerator 200, feature map data may be stored in the vector data memory 212.

The program memory 213 may be a flash memory generally used to execute programs and instructions. The program memory 213 may be a hard drive or a solid-state drive (SSD). For example, the program memory 213 may store compiled programs and instructions. The controller 130 may identify the first index value based on a field of an instruction received from the program memory 213, thereby storing the first data corresponding to the first index value in the LUT memory 110 or controlling the LUT memory 110 to output the first data corresponding to the first index value.

The direct memory access (hereinafter, also referred to as "DMA") unit 221 may be a unit that allows access to memory independently of the vector processor 100. Here, the memory may include the first memory 210 and a second memory 230. The DMA unit 221 may perform data movement without intervention from the vector processor 100. Accessing memory through the DMA unit 221 may result in fewer interrupts, and the vector processor 100 may perform another operation while data is being moved, which may significantly increase the computational efficiency of the accelerator 200.

The computational unit 222 may be a dedicated unit for quickly processing a predetermined operation of the accelerator 200 including a systolic array and the like, related to data reuse and matrix multiplication. For example, it may be efficient to perform a pooling operation and an activation operation in the vector processor 100 and perform a convolution operation in the computational unit 222. However, it may be more efficient to perform a depthwise convolution operation in the vector processor 100 among convolution operations, but this is merely an example.

In FIG. 2, the second memory 230 is a memory external to the accelerator 200, and may store data stored in the memory located in the accelerator 200 or data generated according to an operation of the accelerator 200. The second memory 230 may be referred to as an external memory. The external memory may be a dynamic random-access memory (DRAM).

Although not shown in FIG. 2, the vector processor 100 may include a vector register and a scalar register. In this instance, the controller 130 may store the first data stored in at least one of the first memory 210 in the accelerator 200 including the vector register, the scalar register and the vector processor 100, and the second memory 230 located external to the accelerator 200, in the LUT memory 110 based on the first index value. In addition, the controller 130 may store the first data stored in the LUT memory 110 based on a fourth index value in at least one of the first memory 210 in the accelerator 200 including the vector register, the scalar register and the vector processor 100, and the second memory 230 located external to the accelerator 200. In relation to this, the vector processor 100 may include a datapath between the LUT memory 110 and at least one of the vector register, the scalar register, the first memory 210, and the second memory 230.

Although not shown in FIG. 2, the vector processor 100 may include a vector memory access unit. The vector memory access unit may be a unit that serves as an interface so that vector data generated by an operation in the vector processor 100 is to be stored in the vector data memory 212 in the accelerator 200. In addition to this, the vector memory access unit may be a unit that serves as an interface so that vector data generated by an operation in the vector processor 100 is to be stored in the vector register and the like, in the vector processor 100.

Although not shown in FIG. 2, the vector processor 100 may include a separate DMA unit that is different from the DMA unit 221 and located in the vector processor 100. Specifically, the vector processor 100 may include a DMA unit that stores the first data stored in the first memory 210 or the second memory 230 into the LUT memory 110, or stores the first data stored in the LUT memory 110 into the first memory 210 or the second memory 230.

A datapath may be a path along which data including vector data and scalar data moves. A datapath between the second processing unit 122 and the LUT memory 110 will be described with reference to FIG. 3A, and a datapath between the LUT memory 110 and at least one of the vector register, the scalar register, the first memory 210, and the second memory 230 will be described with reference to FIG. 3B.

Figure 3A:
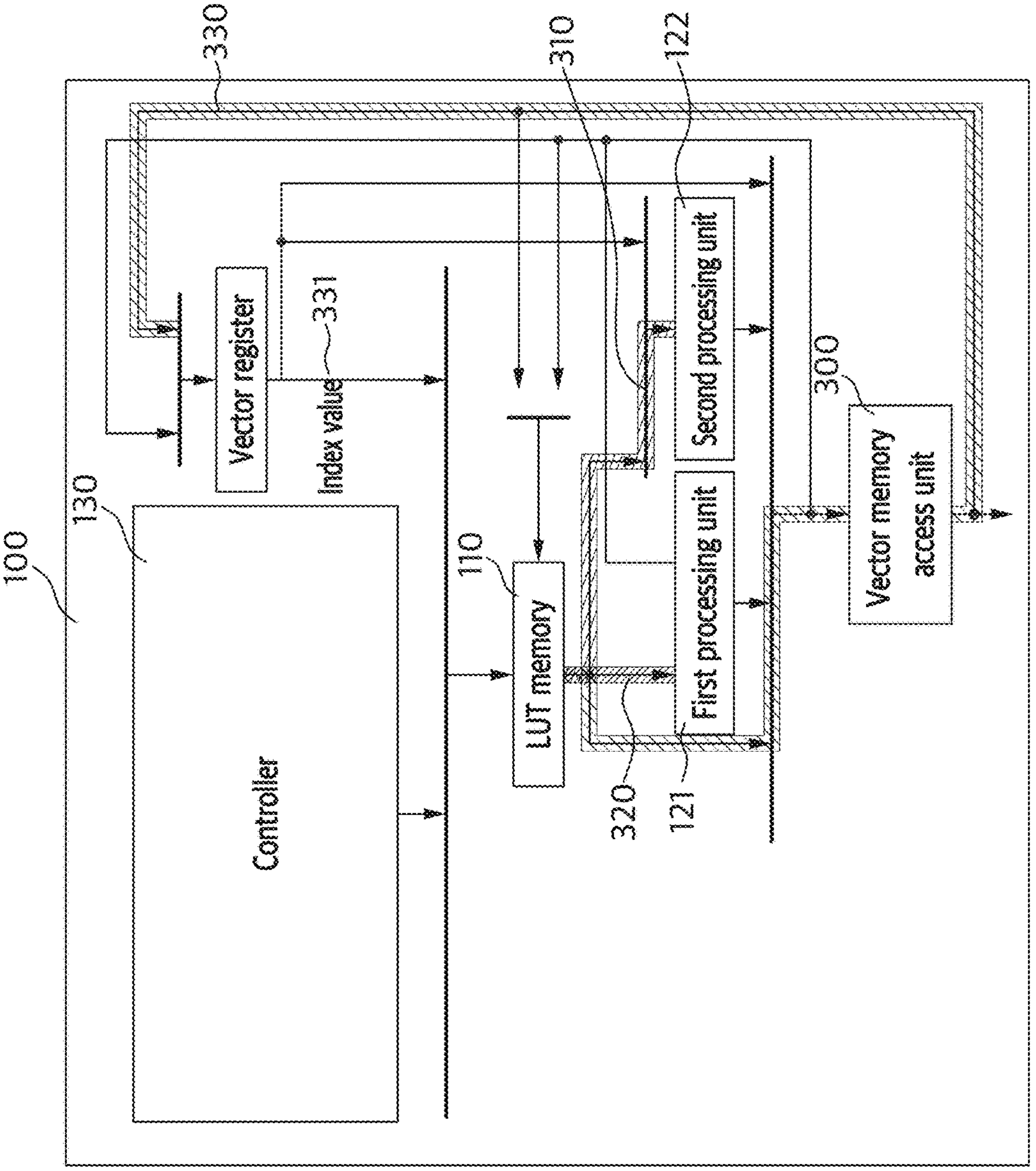
FIG. 3A illustrates a vector processor including a datapath between a lookup table (LUT) memory and a second processing unit.

FIG. 3A illustrates a vector processor including a datapath between an LUT memory and a second processing unit.

Referring to FIG. 3A, a first datapath 310 may be formed between the second processing unit 122 and the LUT memory 110. Specifically, the first datapath 310 may be a datapath for data output from the LUT memory 110 to be input to the second processing unit 122. The controller 130 may control data corresponding to an index value to be transferred from the LUT memory 110 to the second processing unit 122 through the first datapath 310. Accordingly, the second processing unit 122 may perform a predetermined operation based on the data transmitted from the LUT memory 110.

For example, the second processing unit 122 may perform one of arithmetic operations including a complement operation and a division operation based on data. Alternatively, the second processing unit 122 may perform one of logical operations including an and operation, an or operation, a not operation, an xor operation, and a shift operation based on data. For example, the second processing unit 122 may use data transferred from the LUT memory 110 through the first datapath 310 as input data for an operation.

Referring to FIG. 3A, the second datapath 320 may be formed between the first processing unit 121 and the LUT memory 110. Specifically, the second datapath 320 may be a datapath for data output from the LUT memory 110 to be input to the first processing unit 121. The controller 130 may control data corresponding to an index value to be transferred from the LUT memory 110 to the first processing unit 121 through the second datapath 320. Accordingly, the first processing unit 121 may perform a MAC operation based on first data corresponding to a first index value. When an operation related to function approximation is performed in the vector processor 100, the first processing unit 121 may perform a MAC operation based on fourth data identified in the LUT memory 110 based on a third index value extracted from third data and the third data.

When the third data is data stored in the vector register, the third index value extracted from the third data may be upper T bits of the third data. For example, if 256 data can be stored in the LUT memory 110, T may be 8. For example, if the third index value is 10000000(2), the third index value may correspond to a 128-th ordinal location of the LUT memory 110.

For example, in relation to a MAC operation expressed by Equation 1, the first processing unit 121 may perform a multiplication operation using a first coefficient in the fourth data and the third data. In addition, the first processing unit 121 may perform a sum operation based on a second coefficient in the fourth data and a result of the multiplication operation of the first coefficient in the fourth data and the third data.

The controller 130 may store data stored in the LUT memory 110 in a vector register or a scalar register based on an instruction. For example, referring to FIG. 3A, the third datapath 330 may be formed between the LUT memory 110 and the vector register. Specifically, the third datapath 330 may be a datapath for data output from the LUT memory 110 to be input to the vector register in the vector processor 100.

The data stored in the LUT memory 110 may be stored in the vector register through a vector memory access unit 300. In addition, although not shown in FIG. 3A, the controller 130 may control the data stored in the LUT memory 110 to be transferred to the first memory 210 or the second memory 230 based on an instruction. The data stored in the LUT memory 110 may be stored in the first memory 210 or the second memory 230 through the vector memory access unit 300. In relation to this, the controller 130 may store the first data stored in the LUT memory 110 based on a fourth index value, in at least one of the first memory 210 in the accelerator 200 including the vector register, the scalar register and the vector processor 100, and the second memory 230 located external to the accelerator 200.

An index value 331 may be an index value extracted from data stored in the vector register. For example, the index value 331 may be upper T bits of the data stored in the vector register. The index value 331 may be transferred to the LUT memory 110, and the LUT memory 110 may output data corresponding to the index value. The controller 130 may control the LUT memory 110 to output data corresponding to the index value 331 using the index value 331.

A first index value identified by the controller 130 may be transmitted from the controller 130 to the LUT memory 110, and the LUT memory 110 may output data corresponding to the first index value. In relation to this, the first index value may be a value designated by a field of the instruction. Alternatively, the first index value may be a value generated by a counter logic or FSM operated by the instruction.

Figure 3B:
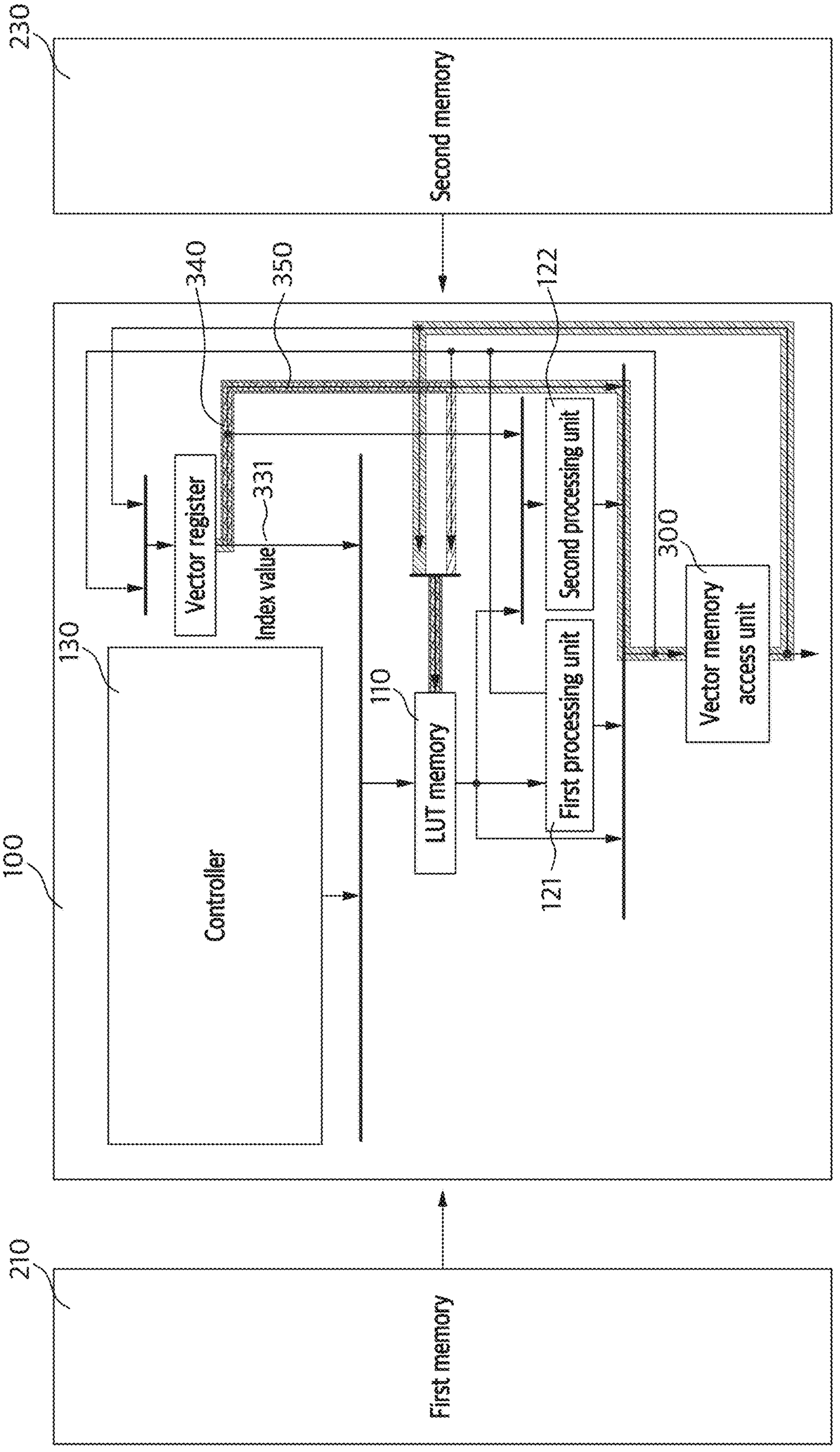
FIG. 3B illustrates a vector processor including a datapath between an LUT memory and at least one of a vector register, a scalar register, a first memory, and a second memory.

FIG. 3B illustrates a vector processor including a datapath between an LUT memory and at least one of a vector register, a scalar register, a first memory, and a second memory.

A datapath may be formed between the LUT memory 110 and at least one of the vector register, the scalar register, the first memory 210, and the second memory 230. In relation to this, the controller 130 may control the first data stored in at least one of the first memory 210 in the accelerator 200 including the vector register, the scalar register and the vector processor 100, and the second memory 230 located external to the accelerator 200 to be transferred to the LUT memory 110 based on the first index value.

According to an example embodiment, a fourth datapath 340 and a fifth datapath 350 of FIG. 3B may each be a datapath formed between the LUT memory 110 and the vector register. Specifically, the fourth datapath 340 may be a datapath for data stored in the vector register to be input to the LUT memory 110 through the vector memory access unit 300. In addition, the fifth datapath 350 may be a datapath for data stored in the vector register to be input to the LUT memory 110 through a multiplexer (MUX).

The controller 130 may control the data stored in the vector register to be transferred to the LUT memory 110 through the fourth datapath 340 or the fifth datapath 350. Accordingly, the LUT memory 110 may store data corresponding to an index value. When a portion of the data stored in the vector register is stored in the LUT memory 110, register pressure may be reduced.

In addition, the controller 130 may update the data stored in the LUT memory 110 based on an instruction. The controller 130 may identify an index value to be updated and new data based on an instruction related to updating the data stored in the LUT memory 110. The controller 130 may update data stored at a predetermined location of the LUT memory 110 corresponding to an index value with new data.

Figure 4A:
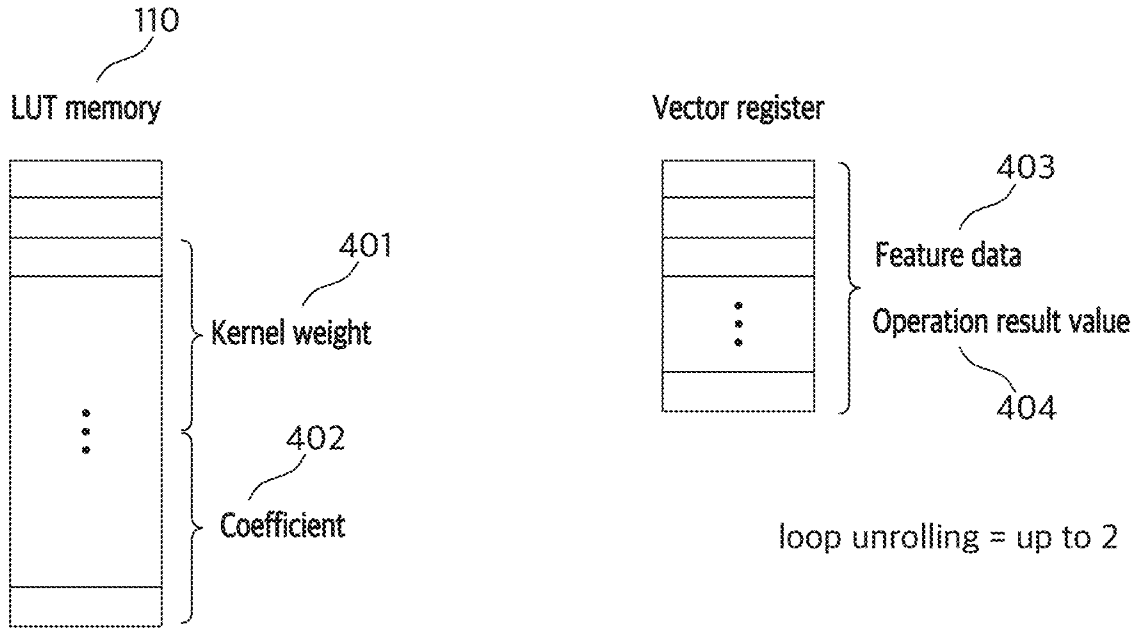
FIG. 4A and FIG. 4B illustrate an example embodiment of distributing and storing data associated with data processing in an LUT memory and a vector register.
Figure 4B:
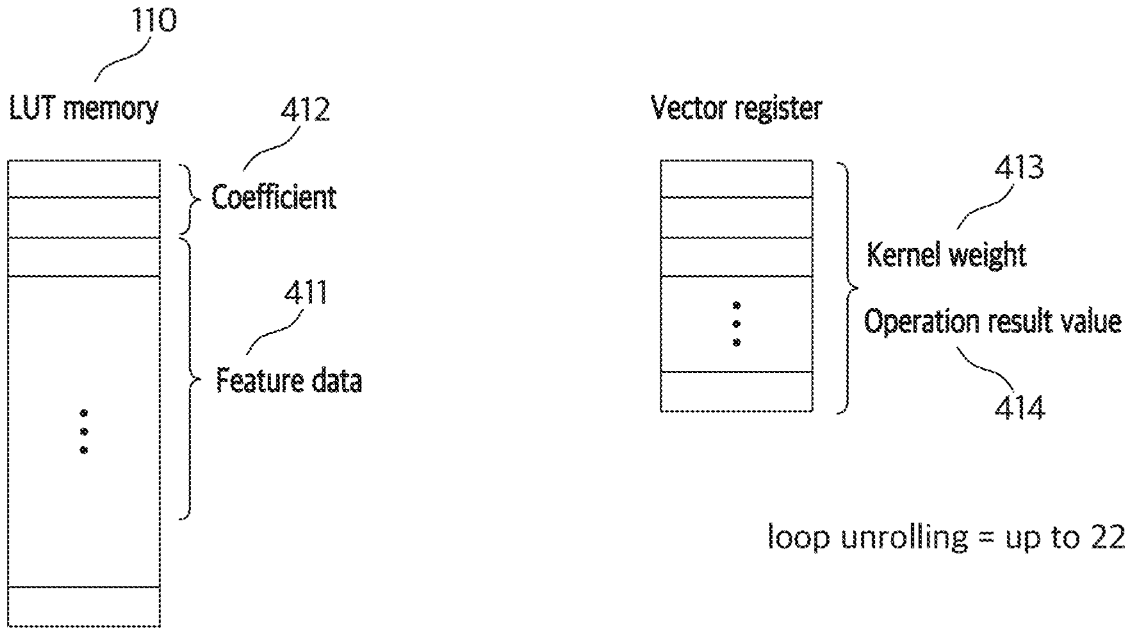

FIG. 4A and FIG. 4B illustrate an example embodiment of distributing and storing data associated with data processing in an LUT memory and a vector register.

First data associated with an operation other than function approximation may correspond to a first index value and be stored in the LUT memory 110. However, unlike when the vector processor 100 reads scalar data from the scalar data memory 211, when the vector processor 100 reads the first data from the vector data memory 212 in the accelerator 200, a large latency may occur. In relation to the latency, 1) the vector data memory 212 is connected to a plurality of processors or data processing modules and sequentially processes instructions received from the plurality of processors or data processing modules. Therefore, it may take a relatively long time for an instruction received before an instruction to read the first data from the vector data memory 212 to be processed. In addition, 2) the vector data memory 212 is located external to the vector processor 100, has to be connected to multiple data processing modules and thus, may be physically located at a relatively long distance from the vector processor 100. Therefore, it may take a longer time for the vector processor 100 to physically read data from the vector data memory 212. Also, 3) it may take a relatively long time for the DMA unit 221 to access the first memory 210 or the second memory 230 independently of the vector processor 100, or for a predetermined operation to be processed through the computational unit 222. For such reasons, the latency for the vector processor 100 to read the first data from the vector data memory 212 in the accelerator 200 may be large.

When code is compiled, loop unrolling of loop statements such as a for statement and a while statement associated with an instruction may be performed together. Here, the loop unrolling is a method of reducing a number of loop iterations by replicating a body of a loop multiple times to be executed all at once. When the code is compiled, if the loop unrolling is performed with respect to an instruction, the instruction may be a loop-unrolled instruction. When processing the loop-unrolled instruction, a computational speed of the vector processor 100 may be boosted as an increment operation, a comparison operation, and the like for loop control are omitted. However, a number of vector registers required to process the loop-unrolled instruction may also increase.

For example, if an operation is a 3*3 kernel operation and a latency occurring when the vector processor 100 reads the first data from the vector data memory 212 is N, the number of vector registers required to process the instruction may be calculated as shown in Table 1 below, according to an example embodiment.

TABLE 1

| Number of times of loop-unrolling | Number of vector registers | Cycle count |
|---|---|---|
| 0 | 20 | N + 10 |
| 1 | 30 | N + 20 |
| 2 | 40 | N + 30 |
| 3 | 50 | N + 40 |

i) For example, when the number of times of loop unrolling is zero and the vector processor 100 performs the 3*3 kernel operation, 1) there may be nine kernel weight-related data, one bias-related data, nine feature data, and one operation result data according to the kernel operation. That is, a number of data related to the 3*3 kernel operation may be 20. If the number of data that can be stored in each vector register is one, the number of vector registers required to perform the 3*3 kernel operation may be 20. 2) In addition, a time required to read bias-related data, kernel weight-related data, and feature data from the vector data memory 212 may be N cycles. Also, a time required to calculate operation result data according to the kernel operation based on the bias-related data, the kernel weight-related data, and the feature data may be 10 cycles. That is, a total time required to perform the 3*3 kernel operation may be N+10 cycles.

ii) Also, for example, when the number of times of loop unrolling is one and the vector processor 100 performs the 3*3 kernel operation, 1) there may be nine kernel weight-related data, one bias-related data, 18 feature data, and two operation result data according to the kernel operation. That is, the number of data related to the 3*3 kernel operation may be 30. If the number of data that can be stored in each vector register is one, the number of vector registers required to perform the 3*3 kernel operation may be 30. Further, when the number of times of loop unrolling is one, a number of times of kernel operation performed by the instruction may be two. 2) In addition, a time required to read the bias-related data, the kernel weight-related data, and the feature data from the vector data memory 212 may be N cycles. Also, a time required to calculate operation result data according to the kernel operation based on the bias-related data, the kernel weight-related data, and the feature data may be 20 cycles. That is, a total time required to perform the 3*3 kernel operation may be N+20 cycles.

The time required to perform the 3*3 kernel operation twice may vary based on the number of times of loop unrolling. 1) When the number of times of loop unrolling is zero, the time required to perform the 3*3 kernel operation twice may be 2*(N+10) cycles. 2) When the number of times of loop unrolling is one, the time required to perform the 3*3 kernel operation twice may be N+20 cycles. The time required when the number of times of loop unrolling is zero may be 2N+20 cycles, which is longer than the time required when the number of times of loop unrolling is one, N+20 cycles. That is, if an operation is performed based on the loop-unrolled instructions, the computational speed of the vector processor 100 may be significantly boosted. Specifically, as the number of times of loop unrolling increases, a time required to complete data processing decreases, so the computational speed of the vector processor 100 may be boosted. However, as discussed above, as the number of times of loop unrolling increases, the number of vector registers required to process the instruction may also increase.

In this instance, to minimize register pressure, the instruction may be defined to store at least a portion of data associated with data processing in the LUT memory 110 and to store a remaining portion of the data associated with data processing in the vector register.

When code is compiled, the number of times of loop unrolling may be determined. The number of times of loop unrolling may be determined based on a free space in the LUT memory 110. For example, the number of times of loop unrolling may be determined based on whether an operation related to linear approximation of a function is performed at a predetermined point in time. Specifically, when the operation related to linear approximation of the function is not performed at the predetermined point in time, it may be determined that the LUT memory 110 has a relatively large free space. In addition, for example, the LUT memory 110 may be divided into a first area in which a coefficient related to function approximation is stored and a second area in which data associated with an operation other than function approximation is stored. Thus, the number of times of loop unrolling may be determined based on a free space in the second area of the LUT memory 110.

Example embodiment 1 through Example embodiment 3 below represent a method in which convolution-related data is divided and stored in the LUT memory 110 and the vector register when a coefficient for linear approximation of a function is stored in the LUT memory 110 and the controller 130 receives the instruction for convolution-related data processing. Example embodiment 1 through Example embodiment 3 may be examples of when the number of vector registers in the vector processor 100 is 32 and the 3*3 kernel operation is performed as represented in Table 1.

Example Embodiment 1

Example embodiment 1 may be an example in which all the convolution-related data is stored in the vector register. For example, the vector register may store bias, kernel weight, feature data, and an operation result value which are the convolution-related data, while the LUT memory 110 may store the coefficient for linear approximation of the function.

The number of times of loop unrolling corresponding to Example embodiment 1 may be one. Referring to Table 1, when the number of times of loop unrolling is two, the number of vector registers required for the kernel operation may be 40, which is greater than the number of vector registers in the vector processor 100, 32. That is, an optimal number of times of loop unrolling may be calculated as one.

However, if there is a free space in the LUT memory 110, at least a portion of the convolution-related data may be stored in the LUT memory 110, as described in Example embodiment 2 and Example embodiment 3. In relation to this, when data processing is the convolution-related data processing, the data stored in the LUT memory 110 may be at least one of a convolution-related kernel weight and feature data. Although a kernel weight and a bias are described separately in the present disclosure, the kernel weight may also be understood as a concept that includes the bias.

Example Embodiment 2

Example embodiment 2 corresponding to FIG. 4A may be an example in which a kernel weight 401 in the convolution-related data is stored in the LUT memory 110. Specifically, the LUT memory 110 may store the kernel weight 401 in addition to a coefficient 402 for linear approximation of a function. Although not shown in FIG. 4A, the LUT memory 110 may also store bias.

The vector register may store feature data 403 and an operation result value 404 which are the convolution-related data. In this instance, an index value corresponding to the kernel weight 401 stored in the LUT memory 110 may be a value designated by a field of an instruction. Alternatively, the index value corresponding to the kernel weight 401 stored in the LUT memory 110 may be a value generated by a counter logic or FSM operated by an instruction.

The number of times of loop unrolling corresponding to Example embodiment 2 may increase up to two. Specifically, when the number of times of loop unrolling is zero, there may be nine feature data used for kernel operation and one operation result value according to the kernel operation. In addition, each time the number of times of loop unrolling increases by 1, feature data used in the 3*3 kernel operation and an operation result value of the kernel operation may increase by 9 and 1, respectively. When the number of times of loop unrolling is two, the number of vector registers required for the kernel operation may be calculated to be 30. In Example embodiment 2, an optimal number of times of loop unrolling may be calculated to be two.

Example Embodiment 3

Example embodiment 3 of FIG. 4B may be an example in which feature data 411 in the convolution-related data is stored in the LUT memory 110. Specifically, the LUT memory 110 may store the feature data 411 in addition to a coefficient 412 for linear approximation of a function. Although not shown in FIG. 4A, the LUT memory 110 may also store bias.

The vector register may store a kernel weight 413 and an operation result value 414 which are the convolution-related data. In this instance, an index value corresponding to the feature data 411 stored in the LUT memory 110 may be a value designated by a field of an instruction. Alternatively, the index value corresponding to the feature data 411 stored in the LUT memory 110 may be a value generated by a counter logic or FSM operated by the instruction.

The number of times of loop unrolling corresponding to Example embodiment 3 may increase up to 22. Specifically, when the number of times of loop unrolling is zero, there may be nine kernel weights used for kernel operation and one operation result value according to the kernel operation. However, the kernel weight is a fixed constant value in the kernel operation. Thus, each time the number of times of loop unrolling increases by one, only the operation result value of the kernel operation may increase by 1. When the number of times of loop unrolling is 22, there may be nine kernel weights and 23 operation result values according to the kernel operation. In this instance, the number of vector registers required for the kernel operation may be 32, identical to the number of vector registers in the vector processor 100. That is, in Example embodiment 3, an optimal number of times of loop unrolling may be calculated to be 22.

In addition to this, based on the free space in the LUT memory 110, data to be stored in the LUT memory 110 may be determined from data associated with data processing. Specifically, when code is compiled, the number of times of loop unrolling and data stored in the LUT memory 110 may be determined based on the free space in the LUT memory 110. For example, when the LUT memory 110 has a relatively large free space, it may be appropriate that a relatively large quantity of data among the data associated with data processing is stored in the LUT memory 110. Also, the number of times of loop unrolling may be set to be relatively large. Conversely, when the LUT memory 110 has a relatively small free space, it may be appropriate that a relatively small quantity of data among the data associated with data processing is stored in the LUT memory 110. Also, the number of times of loop unrolling may be set to be relatively small. In a general kernel operation, the feature data may be a value varying for each kernel operation while the kernel weight is a fixed value. That is, a total data quantity of the feature data may be greater than a total data quantity of the kernel weight.

A data quantity of the coefficient 412 stored in the LUT memory 110 in the example of FIG. 4B may be smaller than a data quantity of the coefficient 402 stored in the LUT memory 110 in the example of FIG. 4A. That is, in the example of FIG. 4B, it may be efficient to store the feature data 411, which has a relatively large data quantity among the data associated with the kernel operation, in the LUT memory 110. Conversely, in the example of FIG. 4A, it may be appropriate to store the kernel weight 401, which has a relatively small data quantity among the data associated with the kernel operation, in the LUT memory 110.

When a quantity of data to be stored in the vector register to perform data processing is greater than a quantity of data that can be stored in the vector register, register spill may occur with respect to a portion of data stored in the vector register. The controller 130 may perform the register spill by storing the first data stored in the vector register into the LUT memory 110 in the vector processor 100. As to this, example embodiments to perform the register spill will be described with reference to FIG. 5A and FIG. 5B below.

Figure 5A:
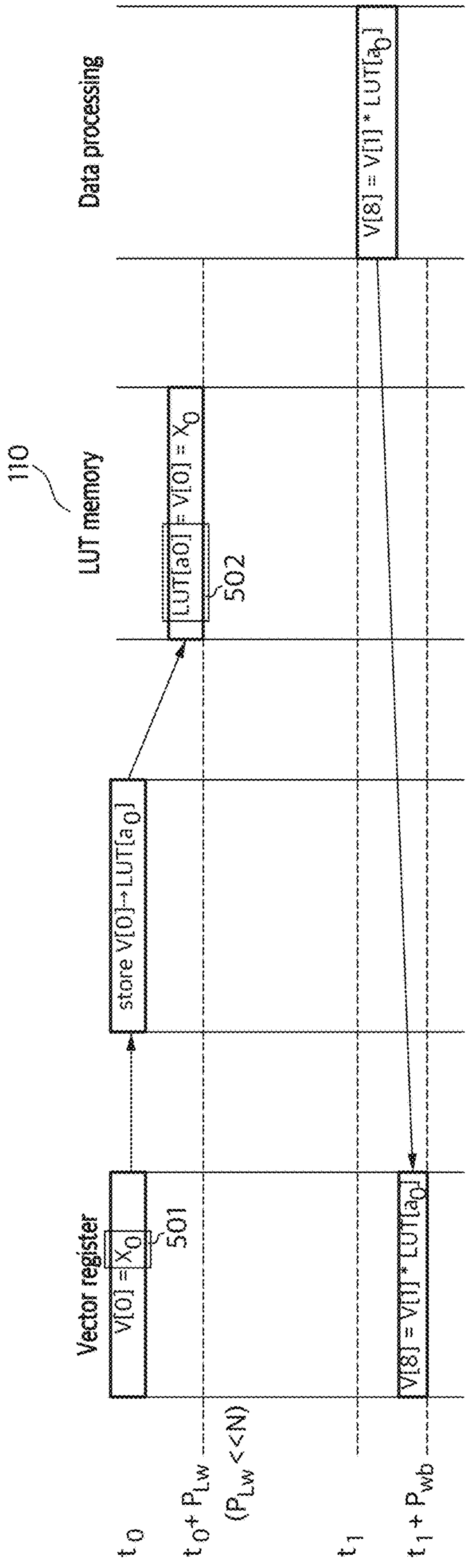
FIG. 5A illustrates a first example embodiment of performing register spill by storing first data, which is stored in a register, in a LUT memory.

FIG. 5A illustrates a first example embodiment of performing register spill by storing first data, which is stored in a register, in a LUT memory.

According to an example embodiment, the controller 130 may identify an instruction. The controller 130 may control a plurality of vector data to be stored in a vector register based on the instruction. When a number of the plurality of vector data is greater than a number of vector registers, register spill may occur in a portion of the data stored in the vector register.

In relation to this, first data is the data stored in the vector register of the vector processor 100, and may be data that causes register spill. The first data identified as a target for the register spill may be a value corresponding to V[0] of the vector register. Here, V[0] may be data stored at a predetermined location in the vector register corresponding to an index value "0." Referring to FIG. 5A, V[0] may be X0 501 which is the first data.

In addition, the controller 130 may identify a first index value based on an instruction. Specifically, the instruction may be an instruction related to storing the first data at a predetermined location in the LUT memory 110 corresponding to the first index value. Referring to FIG. 5A, the first index value may be a0. The instruction may be an instruction related to storing the first data, X0 501, at a predetermined location in the LUT memory 110 corresponding to the first index value, a0.

Here, the first index value may be a value designated by a field of the instruction. Alternatively, the first index value may be a value generated by a counter logic or FSM operated by the instruction. In this instance, a plurality of first index values may be a0, a1, and a2, and a plurality of first data may be X0 501, X1, and X2.

As described with reference to FIG. 3B, the first data stored in the vector register may be transferred to the LUT memory 110 through the vector memory access unit 300. That is, the vector memory access unit 300 may serve as an interface that transfers data stored in the vector register to the LUT memory 110.

According to an example embodiment, the controller 130 may store the first data corresponding to the first index value in the LUT memory 110. For example, the controller 130 may store X0 501 that is the first data corresponding to the first index value, a0 in the LUT memory 110. LUT[a0] 502 may be data stored at a predetermined location in the LUT memory 110 corresponding to the first index value, a0. Referring to FIG. 5A, LUT[a0] 502 may be X0 501 which is the first data. Also, PLw may be a time required for the first data stored in the vector register to be stored in the LUT memory 110.

When register spill occurs in the first data stored in the vector register, it may be efficient to store the first data in the LUT memory 110. Specifically, since the LUT memory 110 is located in the vector processor 100, a physical distance between the vector register and the LUT memory 110 may be less than a distance between the vector register and one of the first memory 210 and the second memory 230. For example, PLw which is the time required for the first data stored in the vector register to be stored in the LUT memory 110 may be shorter than a time N taken for the data stored in the vector register to be stored in one of the first memory 210 and the second memory 230 (PLw<<N).

According to an example embodiment, the controller 130 may identify the instruction and control the processing unit 120 to perform an operation related to data processing.

According to an example embodiment, the controller 130 may control the processing unit 120 to perform an operation based on the first data stored in the LUT memory 110. In FIG. 5A, the operation related to data processing may be expressed by Equation 2.

$$V[8]=V[1]*LUT[a0] \qquad \text{[Equation 2]}$$

In relation to this, the controller 130 may extract V[1] from the vector register and use a0 as an index value to extract LUT[a0] 502, which is the data stored in the LUT memory 110. That is, the controller 130 may directly identify LUT[a0] 502 stored in the LUT memory 110 to perform an operation. As discussed above, LUT[a0] 502 may be X0 501 which is the first data.

The controller 130 may transfer V[1] and LUT[a0] 502 to the processing unit 120. The processing unit 120 may calculate V[8] using Equation 2 based on V[1] and LUT[a0] 502. Since Equation 2 represents a multiplication operation, an operation in the example of FIG. 5A may be performed in the first processing unit 121.

Although not shown in FIG. 5A, the operation related to data processing may also be performed in the second processing unit 122. In this instance, LUT[a0] 502, which is data extracted from the LUT memory 110 using a0 as an index value, may be directly used as an input value of the second processing unit 122 through the first datapath 310.

According to an example embodiment, the controller 130 may store an operation result value in the vector register. For example, the controller 130 may store a result value of the operation related to data processing in the vector register. V[8] may be data stored at a predetermined location in the vector register corresponding to an index value "8." Referring to FIG. 5A, V[8] may be V[1]*LUT[a0].

Pwb may be a time required to perform an operation and store a result value of the operation in the vector register. As discussed above, since the LUT memory 110 is located in the vector processor 100, the physical distance between the vector register and the LUT memory 110 may be less than the distance between the vector register and one of the first memory 210 and the second memory 230. For example, Pwb may be shorter than a total time required to read data stored in one of the first memory 210 and the second memory 230, perform an operation, and store a result value of the operation in the vector register.

Figure 5B:
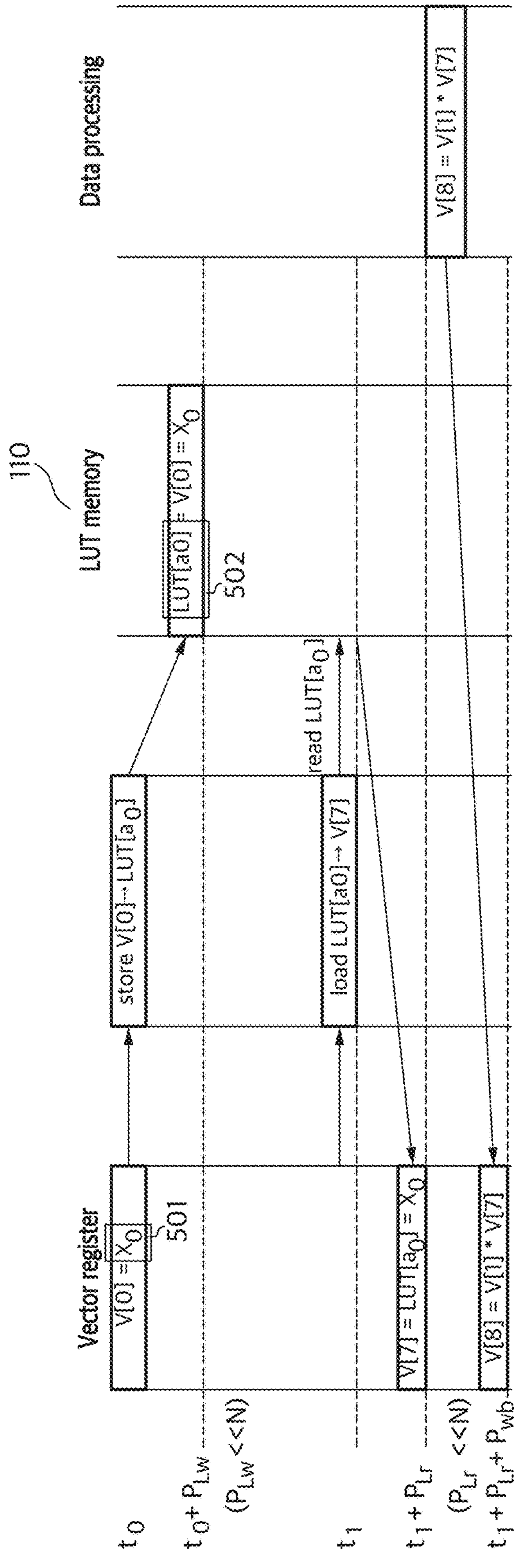
FIG. 5B illustrates a second example embodiment of performing register spill by storing first data, which is stored in a register, in an LUT memory.

FIG. 5B illustrates a second example embodiment of performing register spill by storing first data, which is stored in a register, in an LUT memory.

Referring to FIG. 5B, first data identified as a target of register spill may be X0 501, which corresponds to V[0] of the vector register. Content related to a time from t0 to t0+PLw overlaps with the description of FIG. 5A, repeated descriptions will be omitted.

Unlike FIG. 5A, in FIG. 5B, the controller 130 may transfer the first data stored in the LUT memory 110 back to the vector register. In relation to this, the controller 130 may identify an instruction. Here, the instruction may be an instruction related to storing the first data corresponding to a first index value among data stored in the LUT memory 110 in the vector register. Referring to FIG. 5B, the first index value may be a0. The controller 130 may identify LUT[a0] 502 stored in the LUT memory 110 based on the first index value, a0. Referring to FIG. 5B, LUT[a0] 502, which is data stored in a predetermined location of the LUT memory 110 corresponding to the first index value, a0, may be X0 501, which is the first data.

According to an example embodiment, the controller 130 may store the first data corresponding to the first index value back into the vector register. An index value associated with the first data to be stored in a predetermined location of the vector register may be designated by a field of the instruction. Referring to FIG. 5B, data corresponding to an index value "7" of the vector register may be the first data, X0 501. Unlike FIG. 5A, in FIG. 5B, the controller 130 may store X0 501, which is the first data stored in the LUT memory 110, back into the vector register.

PLr may be a time required for the first data stored in the LUT memory 110 to be stored back into the vector register. Since the LUT memory 110 is located in the vector processor 100, a physical distance between the vector register and the LUT memory 110 may be less than a distance between the vector register and one of the first memory 210 and the second memory 230. For example, PLr may be shorter than a time required for data stored in one of the first memory 210 and the second memory 230 to be stored in the vector register.

According to an example embodiment, the controller 130 may identify an instruction and control the processing unit 120 to perform an operation related to data processing. For example, the controller 130 may perform an operation based on the first data stored in the vector register. An operation in the example of FIG. 5B may be expressed by Equation 3.

$$V[8] = V[1] * V[7] \quad \text{[Equation 3]}$$

In relation to this, the controller 130 may extract V[1] and V[7] from the vector register. The controller 130 may transfer V[1] and V[7] to the processing unit 120. The processing unit 120 may calculate V[8] using Equation 3 based on V[1] and V[7]. The controller 130 may identify X0 501, which is the first data, from V[7] stored in the vector register instead of identifying the first data from LUT[a0] 502 stored in the LUT memory 110. An operation of the vector processor 100 in the example of FIG. 5 may be more efficient in terms of a time required for an operation when compared to an operation of the vector processor 100 in the example of FIG. 5B. In addition, since Equation 3 represents a multiplication operation, the operation in the example of FIG. 5B may be performed in the first processing unit 121.

According to an example embodiment, the controller 130 may store an operation result value in the vector register. For example, the controller 130 may store a result value of an operation related to data processing in the vector register. In relation to this, data corresponding to an index value "8" of the vector register may be V[1]*V[7]. Pwb may be a time required to perform an operation and store a result value of the operation in the vector register. As discussed above, since the LUT memory 110 is located in the vector processor 100, the physical distance between the vector register and the LUT memory 110 may be less than the distance between the vector register and one of the first memory 210 and the second memory 230. For example, PLr+Pwb, which is a total time required to store the first data stored in the LUT memory 110 back into the vector register and store a result value of an operation performed based on the first data stored in the vector register to the vector register may be shorter than a total time taken to read data stored in one of the first memory 210 and the second memory 230, perform an operation, and store a result value of the operation in the vector register.

Figure 6:
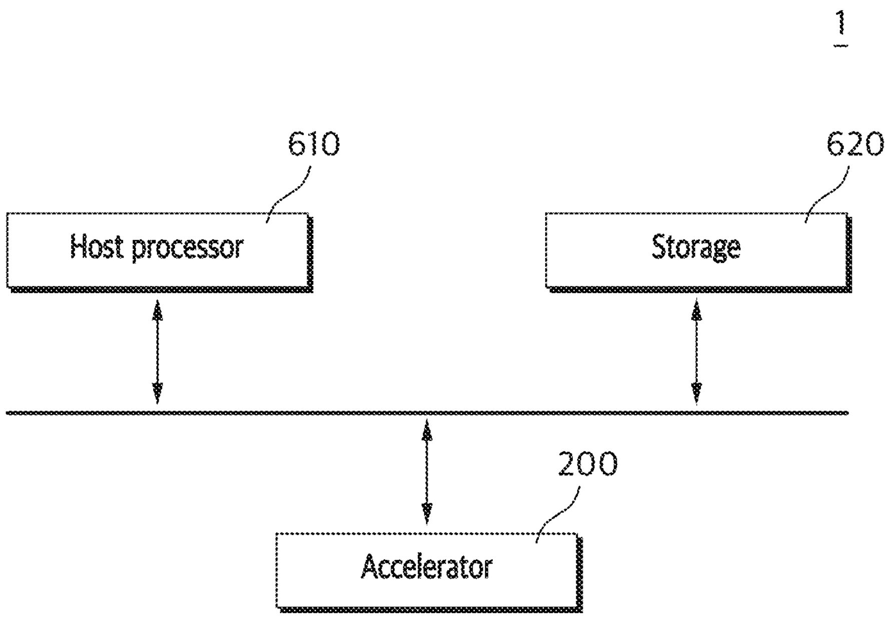
FIG. 6 illustrates an example embodiment of an electronic device.

FIG. 6 illustrates an example embodiment of an electronic device.

An electronic device 1 may be implemented as various types of devices such as a personal computer (PC), a server device, a mobile device, an embedded device, and the like. According to an example embodiment, the electronic device 1 may be, but is not limited to, a smartphone, a tablet device, an augmented reality (AR) device, an Internet of things (IoT) device, an autonomous vehicle, robotics, a medical device, and the like of performing voice recognition, image recognition, and image classification using a neural network.

The electronic device 1 may include a host processor 610, the accelerator 200, and a storage 620. The host processor 610, the accelerator 200, and the storage 620 may communicate with one another via a bus, a network on a chip (NoC), a peripheral component interconnect express (PCIe), and the like. FIG. 6 illustrates the electronic device 1 including elements related to the present example embodiment. However, it is apparent to those skilled in the art that other general-purpose elements can be included in addition to the elements illustrated in FIG. 6.

The host processor 610 serves to control overall functions for operating the electronic device 1. For example, the host processor 610 may execute at least one program or one or more instructions stored in the storage 620 within the electronic device 1, thereby controlling the electronic device 1 overall. The host processor 610 may be implemented as a central processing unit (CPU), a graphics processing unit (GPU), an application processor (AP), and the like provided in the electronic device 1, but is not limited thereto.

The storage 620 is hardware that stores various data processed within the electronic device 1. For example, the storage 620 can store data processed and data to be processed in the electronic device 1. In addition, the storage 620 may store applications, drivers, and the like to be operated by the electronic device 1. Also, the storage 620 may store commands to be executed on the accelerator 200, parameters of the neural network, input data to be inferred, and the like. The storage 620 may include random access memory (RAM) such as DRAM or static random access memory (SRAM), read-only memory (ROM), electrically erasable programmable read-only memory (EEPROM), CD-ROM, Blu-ray or other optical disk storage, hard disk drive (HDD), solid state drive (SSD), or flash memory. According to an example embodiment, the storage 620 may be off-chip memory. In addition, the storage 620 may correspond to the second memory 230.

The accelerator 200 may be the aforementioned accelerator. According to an example embodiment, the accelerator 200 may be dedicated hardware for neural networks to quickly process an operation frequently used in the neural networks. According to an example embodiment, the accelerator 200 may be a hardware accelerator such as an NPU, a TPU, a neural engine, and the like, which are dedicated modules for running neural networks, but is not limited thereto. According to an example embodiment, the accelerator 200 may include a plurality of accelerators. The accelerator 200 may include the vector processor 100 that processes a vector operation.

According to an example embodiment, the vector processor 100 included in the accelerator 200 may include the LUT memory 110 that stores data corresponding to an index value, the processing unit 120 that performs an operation based on data, and the controller 130 that identifies a first index value based on an instruction and store first data in the LUT memory 110 using the first index value. Here, the instruction received by the vector processor 100 may be an instruction or program stored in the storage 620 within the electronic device 1 or the program memory 213 within the accelerator 200.

Figure 7:
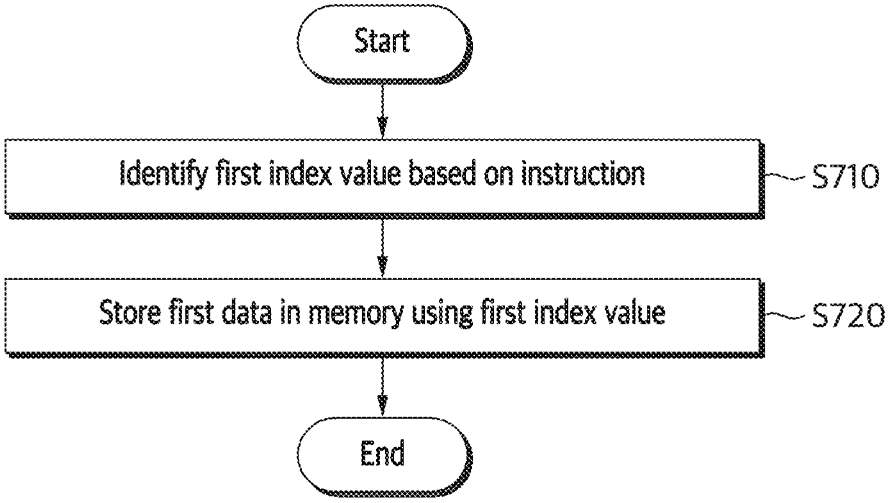
FIG. 7 illustrates an operation method of a vector processor according to an example embodiment.

FIG. 7 illustrates an operation method of a vector processor according to an example embodiment.

Since each operation of the operation method of FIG. 7 is to be performed by the vector processor 100 as described above, repeated descriptions for the descriptions of FIGS. 1 and 2 will be omitted. Here, the vector processor 100 may include the LUT memory 110 that stores data corresponding to an index value and the processing unit 120 that performs an operation based on the data.

In operation S710, the vector processor 100 may identify a first index value based on an instruction. Specifically, the controller 130 in the vector processor 100 may identify the first index value based on the instruction. The controller 130 may be a unit that controls an overall operation of the vector processor 100. The first index value may be a value designated by a field of the instruction. In addition, the first index value may be a value generated by a counter logic or FSM operated by the instruction.

In operation S720, the vector processor 100 may store first data in the LUT memory 110 using the first index value. The LUT memory 110 may be a memory that stores the data corresponding to the index value. For example, the LUT memory 110 may be an LUT memory that outputs the data corresponding to the index value as output data in response to an index value being input as input data. Specifically, the LUT memory 110 may simultaneously output a plurality of data stored at a plurality of locations in the LUT memory 110 to correspond to the plurality of index values. The data may include a coefficient for linear approximation of a predetermined function. The first data corresponding to the first index value identified based on the instruction may be data associated with a general operation other than function approximation.

According to an example embodiment, an operation of storing the first data in the LUT memory 110 using the first index value may further include performing a predetermined operation based on the first data identified in the LUT memory 110 based on the first index value, and the processing unit 120 in the vector processor 100 may include the second processing unit 122, which is an ALU.

According to an example embodiment, the operation of storing the first data in the LUT memory 110 using the first index value may include an operation of storing the first data stored in at least one of the first memory 210 in the accelerator 200 including the vector register, the scalar register and the vector processor 100, and the second memory 230 located external to the accelerator 200, in the LUT memory 110 based on the first index value.

According to an example embodiment, the operation of storing the first data in the LUT memory 110 using the first index value may include an operation of storing the first data stored in the LUT memory 110 based on a fourth index value in at least one of the first memory 210 in the accelerator 200 including the vector register, the scalar register and the vector processor 100, and the second memory 230 located external to the accelerator 200.

According to an example embodiment, when the vector processor 100 further includes the vector register, the operation of storing the first data in the LUT memory 110 using the first index value may include an operation of storing at least a portion of data associated with data processing in the LUT memory 110 and storing a remaining portion of the data associated with data processing other than the at least a portion, in the vector register.

According to an example embodiment, when the vector processor 100 further includes the vector register, the operation of storing the first data in the LUT memory 110 using the first index value may include an operation of storing the first data stored in the vector register into the LUT memory 110 to perform register spill.

Meanwhile, the present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic device or terminal in accordance with the above-described example embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present example embodiments may be represented by functional blocks and various processing steps. These functional blocks may be implemented by various numbers of hardware and/or software configurations that execute specific functions. For example, the present example embodiments may adopt direct circuit configurations such as a memory, a processor, a logic circuit, and a look-up table that may execute various functions by control of one or more microprocessors or other control devices. Similarly to that elements may be executed by software programming or software elements, the present example embodiments may be implemented by programming or scripting languages such as C, C++, Java, assembler, and Python including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described example embodiments are merely examples and other embodiments may be implemented within the scope of the following claims.

NATIONAL RESEARCH AND DEVELOPMENT PROJECT SUPPORTING THIS INVENTION

[Project unique number] 1711152619
[Project number] 2021-0-00310-004
[Ministry Name] Ministry of Science and ICT
[Project management (specialized) institute name] Information and Communication Planning and Evaluation Institute
[Research project name] Next-generation intelligent semiconductor technology development (design)
[Research project name] Development of 2,000 TFLOPS server artificial intelligence deep learning processor and module
[Contribution rate] 1/1
[Name of the entity performing the project] Sapeon Korea Co., Ltd.
[Research Period] 2021.04.01-2024.12.31

The invention claimed is:

1. A vector processor comprising:

a look-up table (LUT) memory in which data corresponding to an index value is stored;

a vector register;

a processing unit configured to perform an operation based on the data; and a controller configured to identify a first index value based on an instruction and store first data in the LUT memory using the first index value, wherein the instruction relates to data processing for a first operation performed by the processing unit, and wherein vector data associated with the data processing for the first operation is distributed and stored among the LUT memory and the vector register, wherein, when the instruction is a loop-unrolled instruction, the controller is configured to store at least a portion of data associated with the data processing in the LUT memory and store a remaining portion other than the at least a portion among the data associated with the data processing in the vector register, wherein a number of times of loop unrolling and the at least a portion of the data are determined based on an amount of free space in the LUT memory.

2. The vector processor of claim 1, wherein the index value is extracted from data stored in the vector register.

3. The vector processor of claim 1, wherein the data includes a coefficient for linear approximation of a predetermined function.

4. The vector processor of claim 1, wherein the first index value is a value designated by a field of the instruction.

5. The vector processor of claim 1, wherein the processing unit comprises a first processing unit for a multiply and accumulation (MAC) operation and a second processing unit that is an arithmetic and logic unit (ALU), and the second processing unit is configured to perform a predetermined operation based on second data identified in the LUT memory based on a second index value.

6. The vector processor of claim 5, wherein the first processing unit is configured to perform a MAC operation based on fourth data identified in the LUT memory based on third data and a third index value extracted from the third data, and the fourth data includes a coefficient for linear approximation of a predetermined function.

7. The vector processor of claim 1, wherein the controller is configured to store the first data in the LUT memory based on the first index value, the first data being initially stored in at least one of a first memory in an accelerator, and a second memory located external to the accelerator, wherein the accelerator includes the first memory, the vector register, a scalar register and the vector processor.

8. The vector processor of claim 1, wherein the controller is configured to store the first data stored in the LUT memory based on the first index value, in at least one of a first memory in an accelerator, and a second memory located external to the accelerator, wherein the accelerator includes the first memory, the vector register, a scalar register and the vector processor.

9. The vector processor of claim 1, wherein the first index value is a value generated by a finite state machine (FSM) or counter logic operated based on the instruction.

10. The vector processor of claim 5, wherein the vector processor comprises a datapath between the second processing unit and the LUT memory.

11. The vector processor of claim 7, wherein the vector processor comprises a datapath between the LUT memory and at least one of the vector register, the scalar register, the first memory, and the second memory.

12. The vector processor of claim 1, wherein the controller comprises a direct memory access (DMA) unit configured to store, in the LUT memory, the first data stored in a first memory in an accelerator including the vector processor or a second memory located external to the accelerator or store the first data stored in the LUT memory in the first memory or the second memory.

13. The vector processor of claim 1, wherein when the data processing is data processing related to convolution, the at least a portion includes at least one of feature data and a kernel weight related to the convolution.

14. The vector processor of claim 1, wherein the controller is configured to store the first data that is initially stored in the vector register, in the LUT memory to perform register spill.

15. The vector processor of claim 14, wherein the controller is configured to store the first data, stored in the LUT memory, back in the vector register.

16. The vector processor of claim 1, wherein the LUT memory is a memory configured to simultaneously output a plurality of data stored at a plurality of locations in the LUT memory to correspond to a plurality of index values.

17. The vector processor of claim 1, wherein the data is stored in a first area of the LUT memory, and the first data is stored in a second area of the LUT memory.

18. An operation method of a vector processor comprising a look-up table (LUT) memory in which data corresponding to an index value is stored, a vector register, and a processing unit configured to perform an operation based on the data, the operation method comprising:

identifying a first index value based on an instruction, the instruction relates to data processing for a first operation performed by the processing unit; and storing first data in the LUT memory using the first index value, wherein vector data associated with the data processing for the first operation is distributed and stored among the LUT memory and the vector register, wherein, when the instruction is a loop-unrolled instruction, the storing comprises:

storing at least a portion of data associated with the data processing in the LUT memory; and storing a remaining portion other than the at least a portion among the data associated with the data processing in the vector register, wherein a number of times of loop unrolling and the at least a portion of the data are determined based on an amount of free space in the LUT memory.

19. A non-transitory computer-readable recording medium comprising a program for performing the operation method of claim 18 on a computer.

* * * * *